(12) United States Patent
Hsu et al.

(10) Patent No.: US 8,803,464 B2
(45) Date of Patent: Aug. 12, 2014

(54) FAN SPEED CONTROL CIRCUIT

(71) Applicants: Chih-Yuan Hsu, New Taipei (TW); Ming-Yu Liao, New Taipei (TW)

(72) Inventors: Chih-Yuan Hsu, New Taipei (TW); Ming-Yu Liao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 37 days.

(21) Appl. No.: 13/664,444

(22) Filed: Oct. 31, 2012

(65) Prior Publication Data
US 2014/0062372 A1 Mar. 6, 2014

(30) Foreign Application Priority Data
Sep. 3, 2012 (TW) .............................. 101131976 A

(51) Int. Cl.
*G05D 23/00* (2006.01)
(52) U.S. Cl.
USPC ............. 318/471; 318/599; 318/55; 318/779; 361/695

(58) Field of Classification Search
USPC ........................... 318/471, 55, 163, 779, 599; 361/679.48, 695
See application file for complete search history.

(56) References Cited

U.S. PATENT DOCUMENTS

| 7,183,734 B2* | 2/2007 | Lassen ..................... 318/400.34 |
| 7,342,370 B2* | 3/2008 | Greene et al. ................. 318/432 |
| 2006/0186846 A1* | 8/2006 | Lassen ......................... 318/439 |

* cited by examiner

*Primary Examiner* — Bentsu Ro
*Assistant Examiner* — Iftekhar Mustafa
(74) *Attorney, Agent, or Firm* — Novak Druce Connolly Bove + Quigg LLP

(57) ABSTRACT

A fan speed control circuit is provided. The circuit includes a control chip. The control chip stores a relationship table recording a number of duty cycle intervals and a number of rotational speeds of a fan. Each duty cycle interval corresponds to one rotational speed of the fan. The control chip obtains a preset number of PWM signals outputted by a processing chip; determines the average value according to the duty cycle of the obtained preset number of PWM signals; determines which duty cycle interval the average value is in, according to the relationship table; determines the rotational speed of the fan corresponding to the determined duty cycle interval according to the relationship table; and controls the fan to rotate according to the determined rotational speed.

7 Claims, 3 Drawing Sheets

FAN SPEED CONTROL CIRCUIT

BACKGROUND

1. Technical Field

The present disclosure relates to fan speed control circuits and, more particularly, to a fan speed control circuit with one sensor.

2. Description of Related Art

Electronic components of an electronic device generate heat during operation of the electronic device. Thus, the electronic device may use a number of fans to dissipate heat. Usually, the electronic device employs thermal sensors to detect the temperature of electronic components, and control the fans to rotate according to the detected temperature. As one electronic component needs one sensor to detect the temperature thereof, thus a great number of thermal sensors may be needed in an electronic device, which may increase the cost of the electronic device. Therefore, it is desired to provide a fan speed control circuit to resolve the above problem.

BRIEF DESCRIPTION OF THE DRAWINGS

The components in the drawings are not necessarily drawn to scale, the emphasis instead being placed upon clearly illustrating the principles of the fan speed control circuit. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
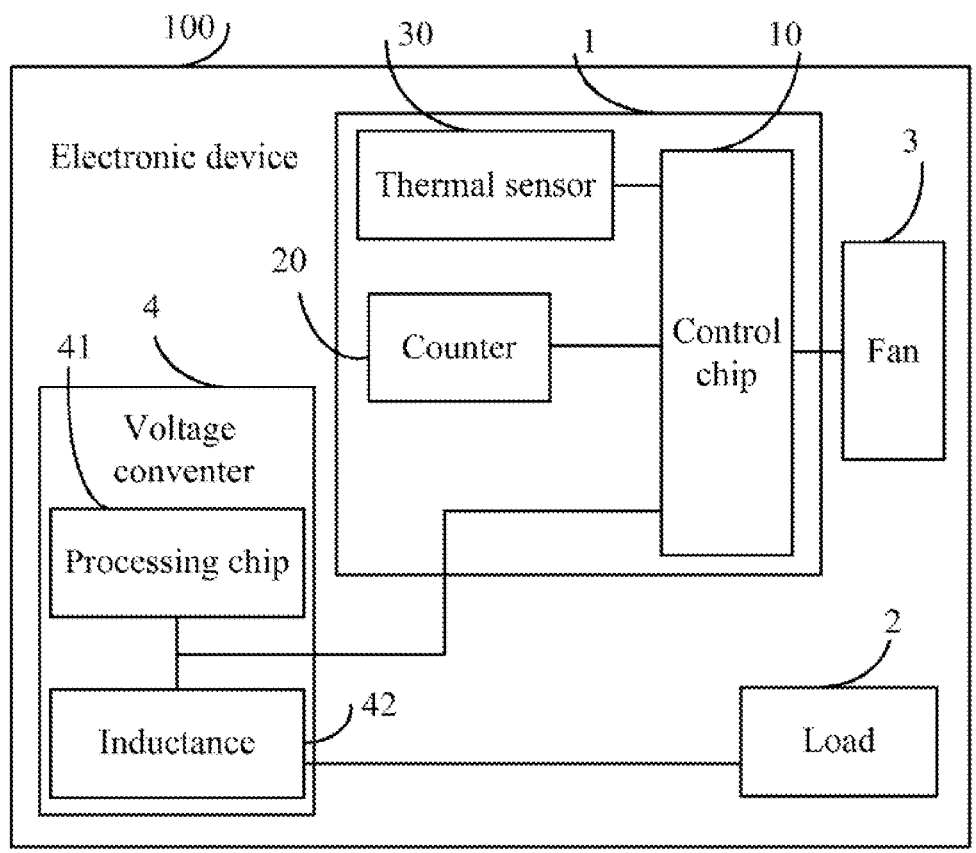
FIG. 1 is a block diagram of a fan speed control circuit in accordance with an exemplary embodiment.

Referring to FIG. 1, an embodiment of a fan speed control circuit 1 applied in an electronic device 100 is illustrated. The electronic device 100 includes at least one load 2, at least one fan 3, and at least one voltage converter 4. Each load 2 corresponds to one fan 3 and one voltage converter 4. In the embodiment, one load 2 is employed to illustrate the principle of the present disclosure. The fan 3 dissipates the heat of the load 2, such as a CPU of the electronic device 100. The load 2 is electrically connected to the voltage converter 4. The voltage converter 4 converts input voltage to a direct current voltage applied to the load 2. The voltage converter 4 includes a processing chip 41 and an inductance 42. The processing chip 41 converts the inputted voltage to a PWM signal containing a unique duty cycle and outputs the PWM signal. The inductance 42 converts the PWM signal, outputted by the processing chip 41, to the direct current voltage and outputs the direct current voltage to the load 2. The duty cycle of the PWM signal outputted by the processing chip 41 becomes greater as the load 2 consumes more electrical power. Thus, the duty cycle of the PWM signal is least when the load 2 is consuming the least amount of electrical power. The circuit 1 includes a control chip 10 connected between the processing chip 41 and the inductance 42. The control chip obtains the duty cycle of the PWM signal, outputted by the processing chip 41, and controls the rotational speed of the fan 3, according to the obtained duty cycle of the PWM signal.

Figure 2:
FIG. 2 is a schematic view of a relationship table showing the relationship between duty cycle intervals and fan speeds in accordance with an exemplary embodiment.

The control chip 10 stores a relationship table 5 (see FIG. 2). The relationship table 5 records a number of duty cycle intervals and a number of rotational speeds of the fan 3. Each duty cycle interval corresponds to one rotational speed of the fan 3. For example, when the duty cycle interval is from 0 to 18, the rotation speed of the fan 3 is 15 revolution per second (rps); and when the duty cycle interval is from 19 to 36, the rotational speed of the fan 3 is 45 rps; when the duty cycle interval is above 37, the rotational speed of the fan 3 is 75 rps. The control chip 10 obtains a preset number of PWM signals, outputted by the processing chip 41; determines an average value according to the duty cycle of the obtained preset number of PWM signals; determines which duty cycle interval the average value is in according to the relationship table 5, determines the rotational speed of the fan 3, corresponding to the determined duty cycle interval according to the relationship table 5; and controls the fan 3 to rotate according to the determined rotational speed. The obtained preset number of PWM signals outputted by the processing chip 41 is presented by $d_{duty1}$, $d_{duty2}$, ..., and $d_{dutyn}$. The average value is presented by $d_{av}$.

The method of determining an average value according to the duty cycle of the obtained preset number of PWM signals is described below. In a first embodiment, the control chip 10 sums all the obtained duty cycles of the preset number of PWM signals, to determine a total duty cycle, and divides the total duty cycle by the number of the obtained PWM signals to determine the average value $$d_{av} = \sum_{i=n} d_{dutyi}/n.$$

In a second embodiment, the control chip 10 further stores an initial duty cycle of the PWM signal. The initial duty cycle of the PWM signal is represented by $d_{idc}$. When the load 2 is at rest, the PWM signal has the initial duty cycle $d_{idc}$. The control chip 10 subtracts the initial duty cycle of the PWM signal from each duty cycle of the preset number of PWM signals to determine a preset number of comparison values. The control chip 10 further sums all the comparison values, to determine a total comparison value, and divides the total comparison value by the number of the obtained PWM signals, to determine the average value $$d_{av} = \sum_{i=n} (d_{dutyi} - d_{idc})/n.$$

In a third embodiment, the initial duty cycle of the PWM signal $d_{idc}$ is still employed. The control chip 10 sums all the obtained duty cycle of preset number of PWM signals, to determine a total duty cycle; divides the total duty cycle by the number of the obtained PWM signals, to determine an average duty cycle; and subtracts the initial duty cycle of the PWM signal from the determined average duty cycle to determine the average value $$d_{av} = \sum_{i=n} d_{dutyi}/n - d_{idc}.$$

In one embodiment, the circuit 1 further includes a counter 20. The counter 20 is electrically connected to the control chip 10 and counts the number of the PWM signals obtained by the control chip 10. The control chip 10 controls the counter 20 to add one upon obtaining each pulse; and when the counting of the counter 20 reaches the preset number, it executes the aforementioned operation of obtaining the preset number of PWM signals, determining the average value, determining the rotational speed of the fan 3, and controlling the fan 3 to rotate. The control chip 10 further resets the counting of the counter 20 to zero when the counting of the counter 20 reaches the preset number.

Figure 3:
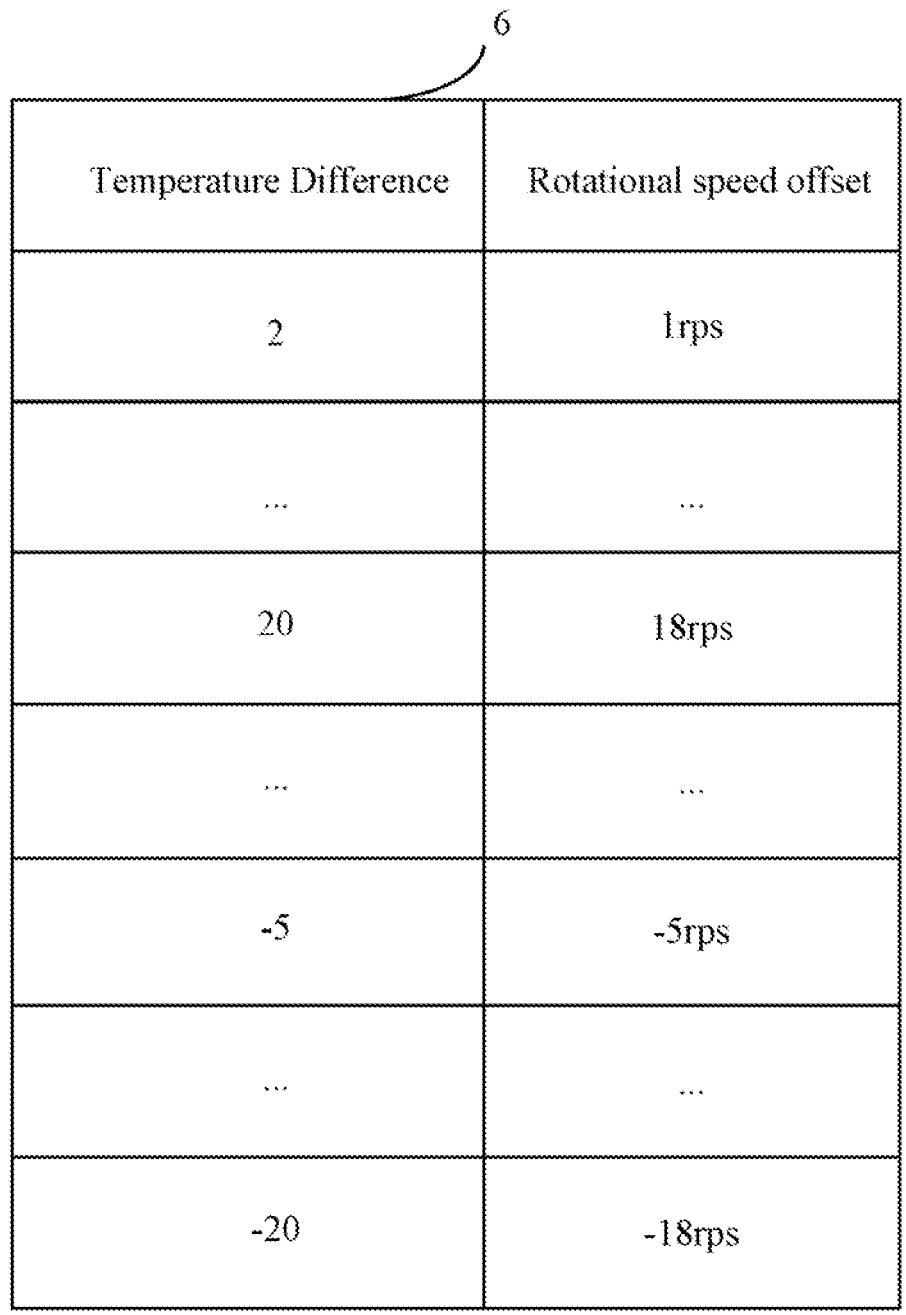
FIG. 3 is a schematic view of an offset table showing the relationship between temperature differences and rotational speed offsets of the fan in accordance with an exemplary embodiment.

The circuit 1 further includes a thermal sensor 30. The thermal sensor 30 detects the temperature of the environment of the load 2. The control chip 10 further stores a standard temperature and an offset table 6 (see FIG. 3). The standard temperature can be a normal temperature of the load 2, or a normal temperature of the environment of the load 2, such as 25° C. The offset table 6 records a number of temperature differences and a number of rotational speed offsets of the fan 3. Each temperature difference corresponds to one rotational speed offset of the fan 3. The control chip 10 obtains the temperature detected by the thermal sensor 30; subtracts the stored standard temperature from the obtained temperature to determine a temperature difference; determines a rotational speed offset of the fan 3 corresponding to the determined temperature difference; adds the determined rotational speed of the fan 3 with the determined rotational speed offset of the fan 3, to determine a total and actual rotational speed of the fan 3; and further controls the fan 3 to rotate at that speed. In the embodiment, the temperature difference may be negative or positive. When the temperature difference is negative, the offset value of the rotational speed of the fan 3 is negative, and when the temperature difference is positive, the offset value of the rotational speed of the fan 3 is positive.

In other embodiments, the offset table 6 records a number of temperature intervals and a number of rotational speed offsets of the fan 3. Each temperature interval corresponds to one rotational speed offset of the fan 3. The control chip 10 executes the aforementioned operations of determining the temperature difference, determines which temperature interval the temperature difference is in, according to the offset table 6, determines the rotational speed offset of the fan 3 corresponding to the determined temperature interval according to the offset table 6; executes the aforementioned operation of determining the total and actual rotational speed of the fan 3; and further controls the fan 3 to rotate with the determined total and actual rotational speed of the fan 3.

With this configuration, only one thermal sensor 30 is employed, thus the cost of the electronic device 100 is decreased.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A fan speed control circuit to control the rotation speed of at least one fan, each of the at least one fan corresponding to one load and being to dissipate heat of the corresponding load, an inductance being connected between a processing chip and one load, each of the at least one processing chip converting the inputted voltage to the PWM signal containing an unique duty cycle and outputting the converted PWM signal, each of the at least one inductance converting the PWM signal outputted by the corresponding processing chip to the direct current voltage and outputting the direct current voltage to the corresponding load, the duty cycle of the PWM signal outputted by each processing chip increasing as the corresponding load consuming more electrical power, the fan speed control circuit comprising:

at least one counter corresponding to the at least one processing chip, each of the at least one counter counting the number of PWM signals outputted by the corresponding processing chip; and a control chip connected between each of the at least one processing chip and the corresponding inductance, and being connected to the at least one counter; the control chip being configured to store a relationship table recording a plurality of duty cycle intervals and a plurality of rotational speeds of the fan; each of the duty cycle intervals corresponding to one of the rotational speeds of the fan; and the control chip being further configured to control each of the at least one counter to add one upon obtaining one pulse outputting by the corresponding processing chip, obtain a preset number of PWM signals outputted by each of the at least one processing chip when the counting of the counter reaches the preset number, determine each average value according to the duty cycle of the obtained preset number of PWM signals outputted by each of the at least one processing chip, determine which duty cycle interval each average value is in, according to the relationship table, determine each rotational speed of the fan corresponding to the determined duty cycle interval according to the relationship table, and control each fan to rotate according to the determined corresponding rotational speed of the fan.

2. The fan speed control circuit as described in claim 1, wherein the control chip sums all the obtained duty cycles of preset number of PWM signals outputted by each of the at least one processing chip, to determine each total duty, and divides each total duty by the corresponding number of the obtained PWM signals, to determine the each average value.

3. The fan speed control circuit as described in claim 1, wherein the control chip:

stores an initial duty cycle of the PWM signal, when the load consuming the least amount of electrical power, the PWM signal containing the initial duty cycle;

subtracts the initial duty cycle of the PWM signal from each duty cycle of the preset number of PWM signals outputted by each of the at least one processing chip to determine a preset number of comparison values; and sums each preset number of comparison values to determine each total comparison value, and divides each total comparison value by the corresponding number of the obtained PWM signals to determines each average value.

4. The fan speed control circuit as described in claim 1, wherein the control chip:

stores an initial duty cycle of the PWM signal, when the load consuming the least amount of electrical power, the PWM signal containing the initial duty cycle; and sums each total obtained duty cycles of preset number of PWM signals outputted by each of the at least one processing chip to determine each total duty cycle, divides each total duty cycle to the corresponding number of the obtained pulses by determine each average duty cycle, and subtracts the initial duty cycle of the PWM signal from the determined each average duty cycle to determine each average value.

5. The fan speed control circuit as described in claim 1, wherein the control chip controls the counter to reset the counting of the counter to zero when the counting of the counter reaches the preset number.

6. The fan speed control circuit as described in claim 1, further comprising a thermal sensor to detect temperature of the environment of the loads, the control chip further storing a standard temperature and an offset table, the offset table recording a plurality of temperature differences and a plurality of rotational speed offsets of the fan, each temperature difference corresponding to one rotational speed offset, wherein the control chip:
- obtains the temperature detected by the thermal sensor, and subtracts the stored standard temperature from the obtained temperature to determine a temperature difference;
- determines a rotational speed offset of the fan corresponding to the determined temperature difference; and
- adds each rotational speed of the fan corresponding to the each determined duty cycle interval with the determined rotational speed offset to determine each total and actual rotational speed of the fan, and further controls each fan to rotate with the corresponding determined total and actual rotational speed of the fan.

7. The fan speed control circuit as described in claim 6, wherein when the temperature difference is negative, the rotational speed offset of the fan is negative, and when the temperature difference is positive, the rotational speed offset is positive.

* * * * *